US008826138B1

(12) United States Patent
Denardo et al.

(10) Patent No.: US 8,826,138 B1
(45) Date of Patent: Sep. 2, 2014

(54) VIRTUAL CONNECT DOMAIN GROUPS

(75) Inventors: John Denardo, Spring, TX (US); Keith L. Kelley, Houston, TX (US); Charles L. Hudson, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1261 days.

(21) Appl. No.: 12/361,449

(22) Filed: Jan. 28, 2009

Related U.S. Application Data

(60) Provisional application No. 61/109,400, filed on Oct. 29, 2008.

(51) Int. Cl.
*G06F 15/177* (2006.01)
*G06F 3/048* (2013.01)
*H04L 12/24* (2006.01)
*H04L 12/56* (2006.01)
*H04L 29/06* (2006.01)
*G06F 15/16* (2006.01)
*H04L 12/46* (2006.01)

(52) U.S. Cl.
CPC .............. *G06F 3/048* (2013.01); *G06F 15/177* (2013.01); *H04L 41/084* (2013.01); *H04L 41/08* (2013.01); *H04L 49/70* (2013.01); *H04L 41/0806* (2013.01); *H04L 49/00* (2013.01); *H04L 41/0846* (2013.01); *H04L 63/104* (2013.01); *G06F 15/161* (2013.01); *G06F 15/16* (2013.01); *H04L 12/4641* (2013.01)
USPC ........... 715/735; 715/738; 709/221; 709/245; 713/1; 713/100; 307/112

(58) Field of Classification Search
CPC . H04L 12/4641; H04L 41/08; H04L 41/0806; H04L 41/0813; H04L 41/084; H04L 41/0846; H04L 49/00; H04L 49/70; H04L 63/104; G06F 15/16; G06F 15/161; G06F 15/177; G06F 3/048
USPC .............. 715/735, 738; 709/221, 245; 713/1, 713/100; 307/112
See application file for complete search history.

(56) References Cited

U.S. PATENT DOCUMENTS

| 6,085,238 | A * | 7/2000 | Yuasa et al. .................... 709/223 |
| 6,950,879 | B2 * | 9/2005 | Zhou .............................. 709/245 |
| 7,280,527 | B2 * | 10/2007 | Basso et al. .................... 370/351 |
| 7,606,867 | B1 * | 10/2009 | Singhal et al. ................ 709/209 |
| 7,631,143 | B1 * | 12/2009 | Niver et al. .................... 711/114 |
| 8,041,789 | B1 * | 10/2011 | Bobco et al. ................... 709/220 |
| 8,060,630 | B1 * | 11/2011 | Jancaitis et al. ............... 709/229 |
| 2002/0091872 | A1 * | 7/2002 | Bourke-Dunphy et al. .. 709/316 |
| 2002/0138578 | A1 * | 9/2002 | Zhou .............................. 709/206 |

(Continued)

OTHER PUBLICATIONS

"HP Virtual Connect Technology Implementation for the HP BladeSystem c-Class," Technology Brief, 2nd Edition, Jun. 2007, Hewlett-Packard Development Company, L.P., 25 p.

*Primary Examiner* — Patrick Riegler

(57) ABSTRACT

A system comprises a processor and a graphical user interface (GUI) executable by the processor. The GUI enables a user to specify constituent virtual connect domains (VCD) for a common VCD group. Each VCD comprises two or more computing devices virtualized by a virtual connect device. The virtual connect device comprises multiple ports for communicatively coupling the two or more computing devices to external networks. For all of the constituent VCDs of a particular VCD group, each corresponding port of a corresponding virtual connect device is connected to the same external.

14 Claims, 4 Drawing Sheets

(56) References Cited

U.S. PATENT DOCUMENTS

| | | | |
|---|---|---|---|
| 2004/0210663 A1* | 10/2004 | Phillips et al. | 709/230 |
| 2005/0047339 A1* | 3/2005 | Dube et al. | 370/230 |
| 2005/0108375 A1* | 5/2005 | Hallak-Stamler | 709/223 |
| 2005/0132065 A1* | 6/2005 | Zhou | 709/227 |
| 2005/0220080 A1* | 10/2005 | Ronkainen et al. | 370/352 |
| 2006/0167886 A1* | 7/2006 | Kantesaria et al. | 707/10 |
| 2007/0078988 A1* | 4/2007 | Miloushev et al. | 709/227 |
| 2007/0168547 A1* | 7/2007 | Krywaniuk | 709/238 |
| 2008/0065824 A1* | 3/2008 | Elliott et al. | 711/112 |
| 2008/0244060 A1* | 10/2008 | Cripe et al. | 709/224 |
| 2008/0270720 A1* | 10/2008 | Tanabe et al. | 711/162 |
| 2008/0288578 A1* | 11/2008 | Silfverberg | 709/203 |
| 2008/0288873 A1* | 11/2008 | McCardle et al. | 715/735 |
| 2008/0310421 A1* | 12/2008 | Teisberg et al. | 370/395.53 |
| 2008/0317217 A1* | 12/2008 | Bernardini et al. | 379/32.03 |
| 2009/0031222 A1* | 1/2009 | Nakamura et al. | 715/735 |
| 2009/0157941 A1* | 6/2009 | Bolan et al. | 711/6 |
| 2009/0172125 A1* | 7/2009 | Shekhar et al. | 709/215 |
| 2009/0187675 A1* | 7/2009 | Kinoshita et al. | 710/8 |
| 2009/0228629 A1* | 9/2009 | Gebhart et al. | 711/6 |
| 2009/0276783 A1* | 11/2009 | Johnson et al. | 718/104 |
| 2009/0304002 A1* | 12/2009 | Yu et al. | 370/395.3 |
| 2009/0304022 A1* | 12/2009 | Yang et al. | 370/463 |
| 2013/0227095 A1* | 8/2013 | Nichele et al. | 709/221 |

* cited by examiner

Create New VCD Group
Creates a new VCD Group based on a single VC Domain

VCD Group Name: [        ]

[Create] [Cancel]

FIG.3

Create New VCD Group
Creates a new VCD Group based on multiple VC Domains

VCD Group Name: [    ] /80

Select the VC Domain on which to base the VCD Group's configuration:
(Note: Other VC Domains will be configured to receive this new configuration.)

- VC-Domain-01
- VC-Domain-02
- VC-Domain-03
- VC-Domain-04
- VC-Domain-05

/82

☐ Assume the VC Domains support the configuration in this VCD Group

[Create] [Cancel]

FIG.4

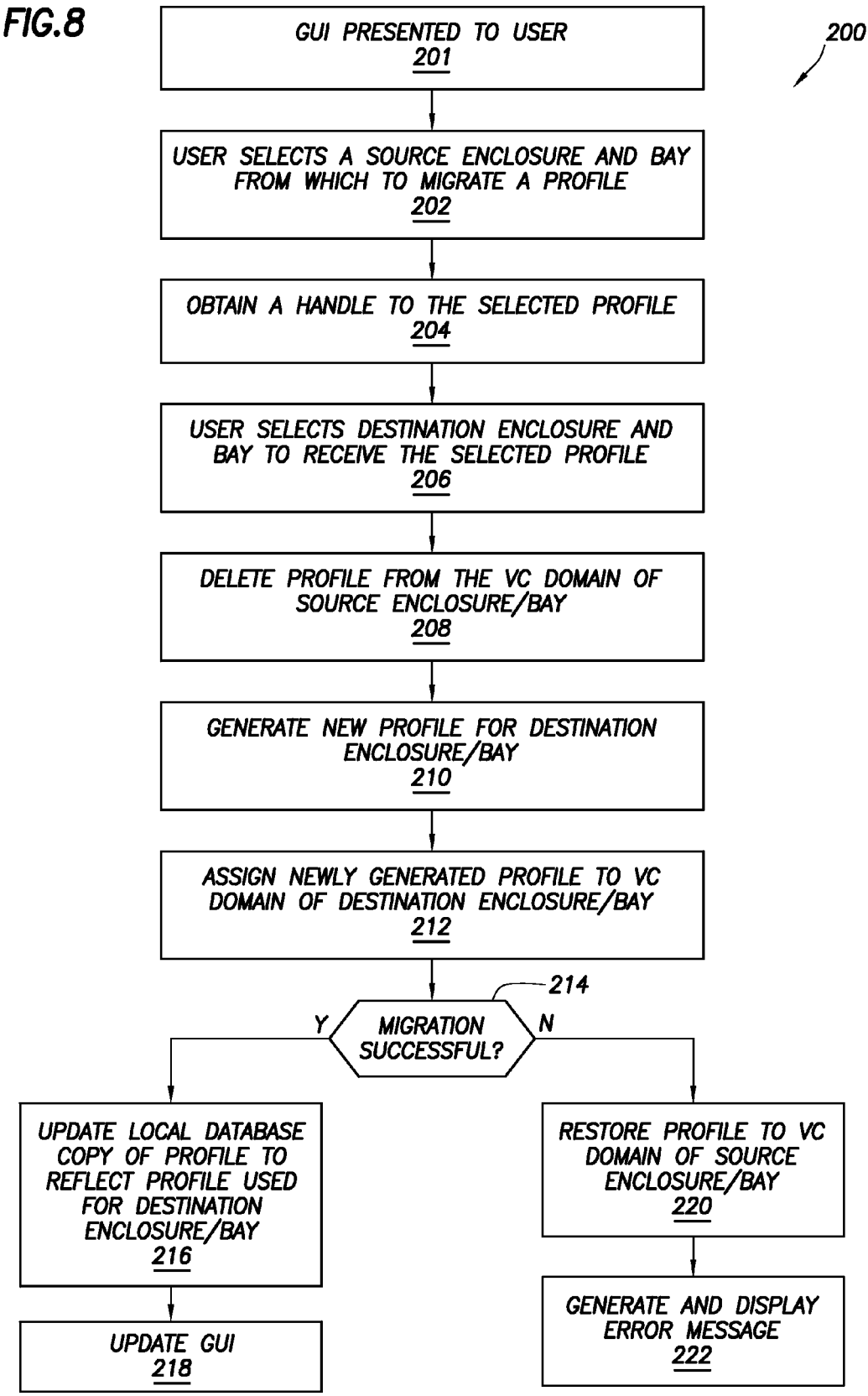

VIRTUAL CONNECT DOMAIN GROUPS

CROSS-REFERENCE TO RELATED APPLICATIONS

This application claims the benefit of provisional patent application Ser. No. 61/109,400, filed Oct. 29, 2008, titled "Virtual Connect Domain Groups."

BACKGROUND

Some computer systems comprise multiple enclosures contained, for example, within a rack. Each enclosure is capable of housing multiple computing devices such as servers (e.g., blade servers). Some systems have many enclosures and thus there may be a large number of computing devices to manage. Managing a large number of computing devices can be problematic and cumbersome.

BRIEF DESCRIPTION OF THE DRAWINGS

For a detailed description of exemplary embodiments of the invention, reference will now be made to the accompanying drawings in which:

FIGS. 3 and 4 illustrate, in accordance with various embodiments, a graphical user interface (GUI) by which a user can create virtual connect domain (VCD) group;

FIG. 8 shows a method in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. The term "system" refers to a combination of two or more components and may refer to a network of computer devices, a single computer, a subsystem within a computer, etc.

Figure 1:
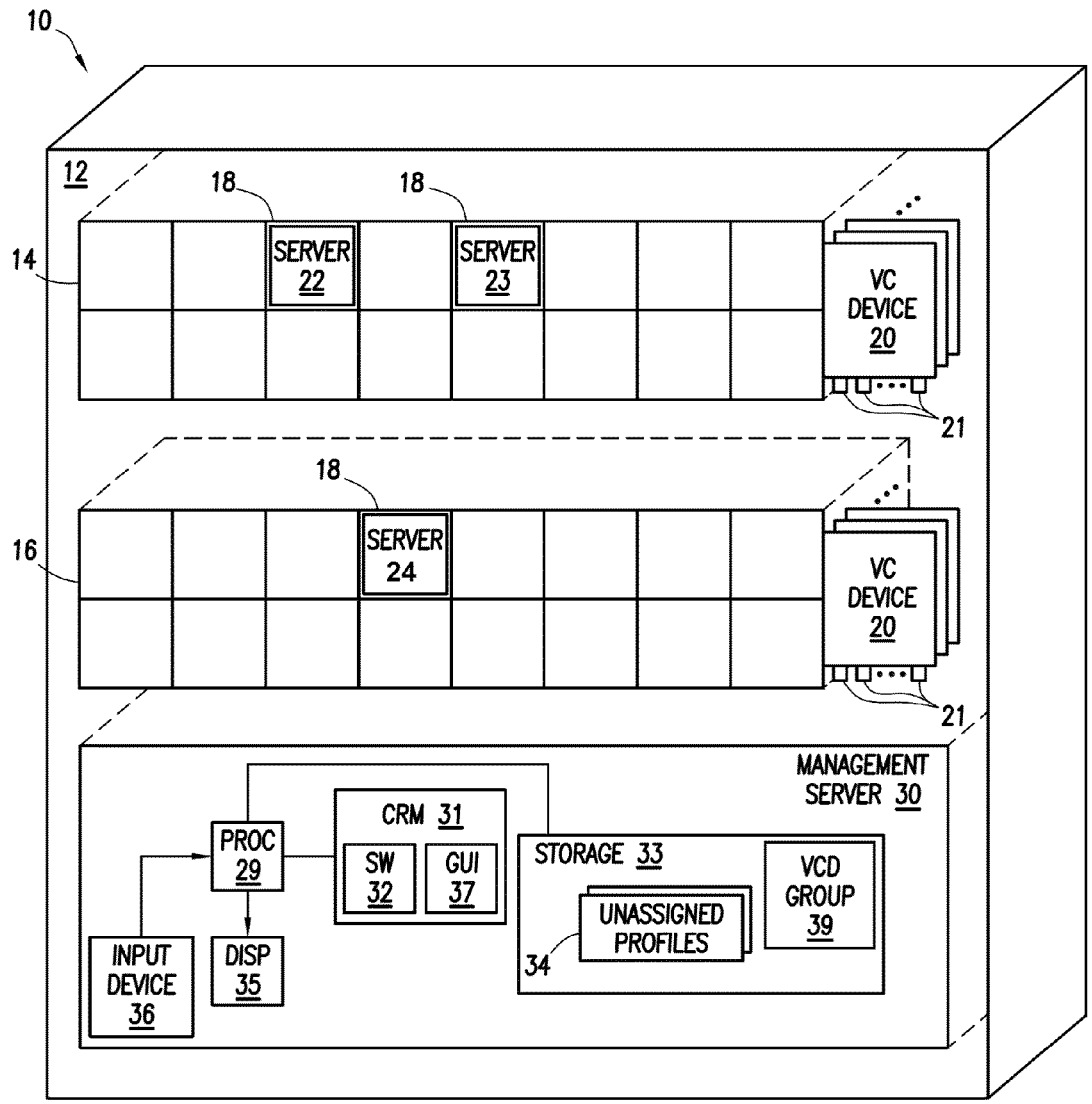
FIG. 1 shows a system in accordance with various embodiments.

FIG. 1 shows a system 10 in accordance with various embodiments. The illustrative embodiment of the system shown comprises an equipment rack 12 in which one or more enclosures 14, 16 can be installed. For purposes of this disclosure, at least one embodiment of an equipment rack is any type of support structure that removably receives and houses one or more enclosures. Each enclosure can accommodate, for example, server computers (e.g., blade servers), storage devices, networking devices (e.g., hubs, routers, switches) or other types of computer network equipment. In the illustrative embodiment depicted in FIG. 1, each enclosure 14, 16 can accommodate up to 16 servers. In other embodiments, an enclosure can accommodate a different number of servers. For sake of clarity, this disclosure refers to servers being housed in the enclosures 14, 16, but devices, as noted above, other than servers can be housed as well. The term "server" is representative of all such devices. Exemplary servers 22, 23, and 24 are shown.

Each enclosure 14, 16 includes multiple bays 18 into which the servers 22-24 are installed. All bays 18 of a given enclosure can be populated with a server, but not al bays 18 need be populated with a server.

Each enclosure 14, 16 is a mechanical housing that can be removed from the rack 12. Although two enclosures 14, 16 are shown installed in rack 12 in the example of FIG. 1, different numbers of enclosures can be installed as desired.

Each enclosure contains or is otherwise coupled to one or more virtual connect devices 20. In some embodiments, each VC device 20 is or contains an Ethernet module (e.g., a switch) or a Fibre Channel module (e.g., a switch). Each VC device 20 contains one or more ports 21 for connection to an external network. The VCDs 20 are programmable to route signals between select ports 21 and select servers in select bays 18.

Each virtual connect device 20 "virtualizes" the servers installed in the various bays 18 of the associated enclosure 14, 16. Virtualizing the servers includes implementing an abstraction layer between the servers and the external networks so that the external networks see a pool of servers rather than individual servers. Local area network (LAN) and storage area network (SAN) connections are made to the pool of servers in a given enclosures. An input/output "profile" is created for each server. Instead of using the default media access control (MAC) addresses for all network interface controllers (NICs) and default World Wide Names (WWNs) for all host bus adapters (HBAs), bay-specific I/O profiles are created and unique MAC addresses and WWNs are assigned to such profiles. Thus, one or more of the bays in a given enclosure 14, 16 can be managed as a "virtual connect domain." All enclosures can be managed as virtual connect domains, but not all enclosures have to be so managed. Thus, one or more enclosures can be managed as virtual connect domains, while one or more other enclosures are not managed as virtual connect domains.

A profile not only specifies the server's MAC addresses and WWNs but also the boot parameters (e.g., primary, secondary, use BIOS (basic input/output system) to boot, disabled). For the "primary" and "secondary" boot parameters, a WWPN (World Wide Port Number) and LUN (logical unit number) are also specified to permit the server to boot from a logical volume of a storage device.

Each server 22, 23, 24 that is part of a virtual connect domain operates according to a profile as described above. Each profile maps that server's MAC addresses and/or WWNs to MAC addresses/WWNs managed by the associated virtual connect device 20. The virtual connect devices 20 thus control communications to/from the various bays in the associated enclosure. In at least some embodiments, a profile is a data file. Each profile being used for a given server is assigned to a particular bay of a particular enclosure. In some embodiments, all profiles assigned to the servers/bays in a given enclosure are stored in the virtual connect device 20 of that particular enclosure.

The system of FIG. 1 also comprises a management server 30 which communicatively couples to the virtual connect devices 20. The management server 30 comprises a computer-readable medium 31 that contains software 32 executable by a processor 29. The computer-readable medium 31 comprises non-volatile storage (e.g., hard disk drive, compact disc read only memory), volatile storage (e.g., random access memory), or combinations thereof. The software 32, when executed by the processor 29, causes the management server 30 to perform one or more of the functions attributed to it in this disclosure. The management server 30 also comprises or is communicatively coupled to a display 35 and an input device 36 (e.g., a keyboard, mouse, etc.). The management server 30 may be installed in the rack 12 (e.g., in an enclosure) or may be separate from the rack 12.

Figure 2:
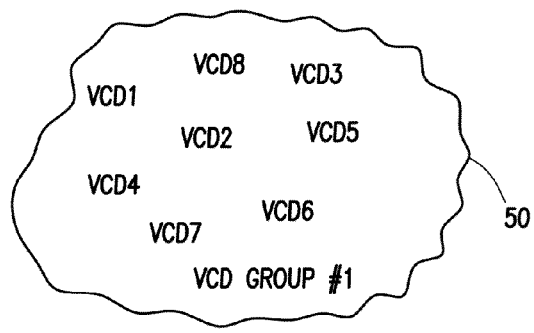
FIG. 2 illustrates that multiple virtual connect domains can be members of a common virtual connect domain group.

As explained above, the various servers virtualized by a common virtual connect device 20 are part of a virtual connect domain (VCD) and that multiple VCDs can be present and operational. FIG. 2 illustrates that multiple VCDs can be part of a common VCD Group. Reference numeral 50 corresponds to a particular VCD Group #1 which contains eight VCDs designated as VCD1-VCD8. In at least some embodiments, for VCDs to be members of a common VCD Group, all such VCDs must have the same connectivity. Having the same connectivity means that the same ports on the VC device 20 are connected to the same external networks. Thus, if a particular VC device 20 in a given VCD has its port number 1 connected to a particular external network, then for another VCD to be a member of the same VCD Group, the same port number of the same VC device 20 of such other VCD must also be connected to the same external network. In some embodiments, the VC devices are identified by the location at which they are mated to the enclosures. For example, in some embodiments, each enclosure can accommodate eight VC devices and thus has eight numbered locations or connectors for such VC devices 20. Thus, common VC devices 20 in separate VCDs refers to the VC devices that are of the same type (e.g., Ethernet, Fiber Channel, etc.) and that are connected to the same connector on the corresponding enclosures.

Referring again to FIG. 1, the management server also comprises storage 33 (volatile and/or non-volatile) for storing VCD Group information 39. Information about more than one VCD Group can be stored in storage 33. The information about each VCD Group includes at least the identity of the various VCDs that are members of that particular group. A user ensures that the connectivity among the various members of a particular group is, in fact, the same. The user programs VCD Group information 39 using, for example, input device 36, display 35, and software 32 working in concert with or containing a graphical user interface (GUI) 37. Via the GUI 37, the user can manage VCD groups and their constituent VCD members. Managing a VCD group includes, for example, creating the VCD group, adding VCD(s) to that group, removing a VCD from a particular group, synchronizing a VCD group, etc. The GUI 37 provides a user with selectable options to perform any of these management tasks.

For instance, if a user desires to create a new VCD group, the GUI 37 presents to the user an action window such as that shown in FIG. 3. The action window of FIG. 3 prompts the user to specify a name for the VCD group to be created. In some embodiments the name is an alphanumeric name. After the name is entered, the user selects the "create" button. The create action window of FIG. 3 is used when the user had only selected one VCD based on which to create a VCD group.

FIG. 4 illustrates the use of the GUI 37 to create a VCD group when multiple VCDs are selected for possible inclusion in the newly created VCD group. As shown, the user is prompted for to enter a VCD name at 80. At 82, the user can select any one or more of the listed VCDs to include in the VCD group being created.

Figure 5:
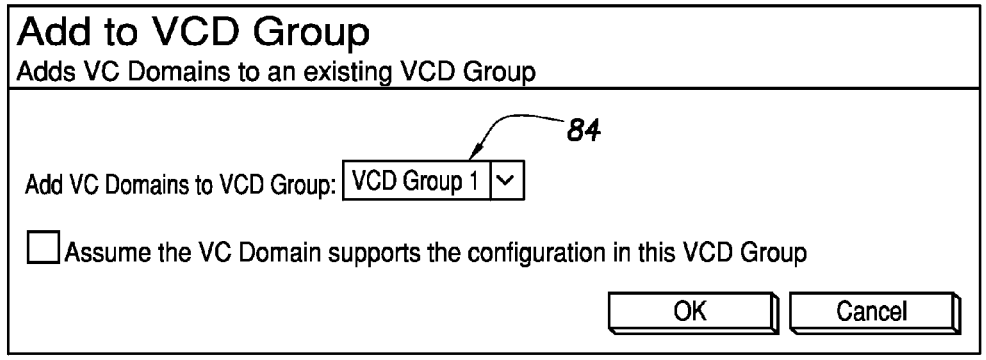
FIG. 5 illustrates the use of the GUI to add VCDs to a selected VCD group in accordance with various embodiments.

FIG. 5 illustrates the use of the GUI 37 to add a VCD to an existing VCD group. The user previously selected a particular VCD and then selected an "add to a VCD group" selection choice resulting in the action window of FIG. 5 being presented to the user. At 84, the user is provided with a drop-down menu of VCD groups from which to choose to add the previously selected VCD. The "OK" button is selected to cause software 32 to add the selected VCD to the selected VCD group.

Figure 6:
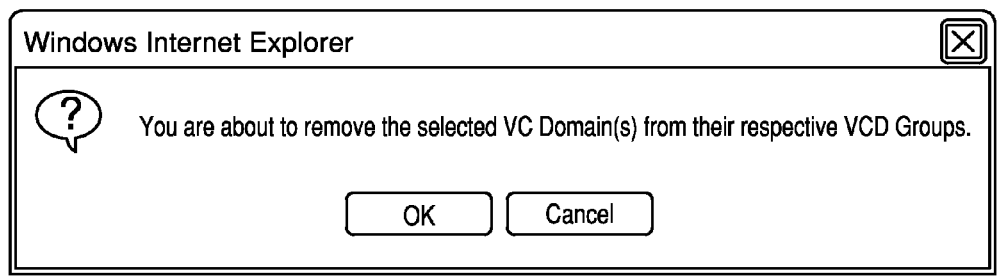
FIG. 6 illustrates the use of the GUI to confirm removal of a VCD from a selected group in accordance with various embodiments.

FIG. 6 illustrates an action window that is presented to the user upon the user selecting a VCD and a "remove" from VCD group selection choice. As shown in FIG. 6, the user is requested to confirm the choice to remove the selected VCD from the corresponding VCD group.

Figure 7:
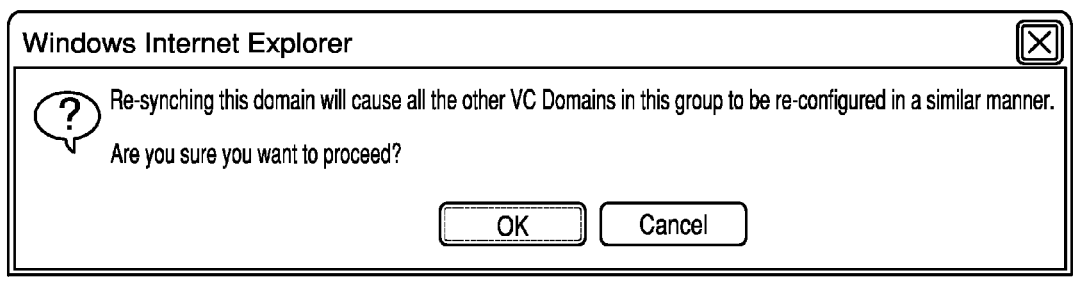
FIG. 7 illustrates the use of the GUI to synchronize the VCDs of a VCD group to a selected VCD of that group in accordance with various embodiments.

FIG. 7 illustrates the VCD group management function of re-synchronizing a selected VCD group. In at least some embodiments, the user selects just one of the group's VCD members and then selects a "re-synchronize" selection choice. The confirmation action window of FIG. 7 is then presented to the user. Upon selecting "OK", the software 32 obtains the configuration associated with the previously selected VCD and uses that particular configuration to over-write the configurations of the other VCD members of the selected VCD group.

The management server also comprises storage 33 (volatile and/or non-volatile) for storing one or more profiles 34 that are applicable to one or more of the various bays in the enclosures 14, 16. In some embodiments, as noted above, the profiles assigned to the servers in a given enclosure are stored in the virtual connect device 20 of that particular enclosure. Copies of all profiles assigned to the servers in a given virtual connect domain are also stored in the management server's storage 33. In other embodiments, the management server 30 does not store copies of the profiles and, instead, the various profiles are stored in the virtual connect devices 20 of system 10. In this latter embodiment, the management server 30 is usable to manage the profiles and their migration (as explained below), but does not actually retain copies of the profiles.

Once it is known which VCDs are members of the same VCD Group, a profile from constituent VCD member can be "migrated" to another VCD member of that same group. In accordance with various embodiments. Migrating a profile means to discontinue its use in a source enclosure/bay and, instead, to use that profile in a bay of another enclosure.

Profile migration can be automatic, such as during a fail over event in which one or more servers in one VCD fail or can initiated manually by a user.

The software 32/GUI 37, executed by the management server 30, permits a user (e.g., a network administrator) to control the use of the various profiles 34 for implementing manual profile migration. The software 32 may also implement automatic profile migration for a fail over event. A user will have previously specified, using software 32/GUI 37, how a fail over will occur (e.g., specify a destination fail over VCD for each VCD that may fail.

FIG. 8 provides an illustrative method 200 implemented on the system 10. Method 200 enables a profile to be migrated from one enclosure to another. At 201, the management server 30, under execution of software 32, presents the GUI on display 35 to a user. Via the GUI, the user selects a source enclosure and bay from which to migrate a profile (202). For example, the user may select the bay in enclosure 14 that contains server 22. At 204, the software 32 obtains a handle to the profile of the source enclosure/bay. At 206, the user selects a destination enclosure and bay to receive the selected profile. For example, the user may select the bay in enclosure 16 that contains server 24. In this example, therefore, the user has specified that the profile associated with the bay containing server 22 in enclosure 14 to be migrated to the bay in enclosure 16 containing server 24.

At 208, the profile associated with the source enclosure/bay is deleted from the source's virtual connect domain. At 210, a new profile is generated for the specified destination enclosure/bay. The new profile includes the same MAC addresses and WWNs as were used for the server in the source enclosure/bay, and will use the same boot parameters to ensure that the OS (operating system) image is loaded from the same location. For a profile to be migrated, that profile should define boot from SAN (storage area network), as opposed, for example, to boot from a local disk. Otherwise, it would not be possible to guarantee that the server's identity regarding the OS (hostname, services and applications running on such OS, etc.) will be the same after the migration. At 212, the newly generated profile is assigned to the virtual connect domain of the destination enclosure/bay.

At 214, the management server 30 determines whether the profile migration was successful. An unsuccessful profile migration is identified by, for example, the determination that any of the preceding actions 204-210 failed to occur or failed to occur correctly. If the profile migration is deemed successful, then at 216, the management server 30 updates a local copy of the migrated profile in storage 33 to reflect that the profile is now being used at the destination enclosure/bay. An update message is provided to the user via the GUI that the profile migration was successful (218).

If the profile migration was not successful, then at 220, the management server 30 automatically restores the profile to the virtual connect domain of the source enclosure/bay. The restoration of the profile back to the source enclosure/bay includes the management server 30 re-assigning the profile to the source enclosure/bay. An error message is provided to the user via the GUI that the profile migration was not successful (222).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a processor;
   a graphical user interface (GUI) executable by said processor, said GUI enables a user to specify constituent virtual connect domains (VCD) for a common VCD group,
   wherein each VCD comprises two or more computing devices virtualized by a virtual connect device, said virtual connect device comprising multiple ports for communicatively coupling the two or more computing devices to external networks,
   wherein each computing device of a VCD includes a device input/output (I/O) profile and each VCD of the common VCD group includes a separate group I/O profile, and
   wherein, via another GUI, the user selects one of the VCDs of the common VCD group and synchronizes group I/O profiles of all other VCDs of the common VCD group to a group I/O profile of the selected VCD.

2. The system of claim 1 wherein the computing devices are housed in enclosures and the computing devices of each VCD are housed in one enclosure that is different than the enclosures used to house computing devices of all other VCDs.

3. The system of claim 1 wherein the GUI enables the user to create a VCD group.

4. The system of claim 3 wherein the GUI enables the user to specify a name for a newly created VCD group.

5. The system of claim 3 wherein the GUI enables the user to create multiple VCD groups, each such VCD group comprising constituent VCDs and the constituent VCDs of a particular VCD group have corresponding ports of corresponding virtual connect devices connected to the same external network.

6. The system of claim 5 wherein the GUI displays to the user a list of the VCD groups and the constituent VCDs of each VCD group.

7. A non-transitory computer-readable medium (CRM) comprising software that, when executed by a processor, causes the processor to:
   provide a graphical user interface (GUI) by which a user can create a virtual connect domain (VCD) group; and
   receive input from the user to create a VCD group,
   wherein each VCD comprises two or more computing devices virtualized by a virtual connect device, said virtual connect device comprising multiple ports for communicatively coupling the two or more computing devices to external networks,
   wherein each computing device of a VCD includes a device input/output (I/O) profile and each VCD of the VDC group includes a separate group I/O profile,
   wherein, for all of the constituent VCDs of a particular VCD group, each corresponding port of a corresponding virtual connect device is connected to the same external, and
   wherein, via another GUI, the user selects one of the VCDs of the VCD group, and the software causes the processor to migrate a group I/O profile from the selected VCD to a group I/O profile of another VCD.

8. The CRM of claim 7 wherein the GUI enables the user to specify a name for a newly created VCD group.

9. The CRM of claim 8 wherein the name is an alphanumeric name.

10. The CRM of claim 7 wherein the GUI enables the user to remove a VCD from a particular VCD group.

11. The CRM of claim 7 wherein the GUI enables a user to create multiple VCD groups and to display a list of the VCD groups and the constituent VCDs of each VCD group.

12. A method, comprising:
 displaying a graphical user interface (GUI) by which a user can view a virtual connect domain (VCD) group; and
 receiving input from the user to manage a VCD group,
 wherein each VCD comprises two or more computing devices virtualized by a virtual connect device, said virtual connect device comprising multiple ports for communicatively coupling the two or more computing devices to external networks,
 wherein each computing device of a VCD includes a device input/output (I/O) profile and each VCD of the VCD group includes a separate group I/O profile,
 wherein, for all constituent VCDs of a particular VCD group, each corresponding port of a corresponding virtual connect device is connected to the same external network, and
 wherein receiving input to manage the VCD group comprises receiving input to synchronize the group I/O profiles of VCDs of a VCD group to a group I/O profile of a user-selected VCD.

13. The method of claim 11 wherein receiving input from the user to manage the VCD group comprising receiving input to add a VCD to a VCD group.

14. The method of claim 12 wherein receiving input to manage the VCD group comprising receiving input to remove a VCD from a VCD group.

* * * * *

UNITED STATES PATENT AND TRADEMARK OFFICE
CERTIFICATE OF CORRECTION

PATENT NO.         : 8,826,138 B1
APPLICATION NO.    : 12/361449
DATED              : September 2, 2014
INVENTOR(S)        : John Denardo et al.

Page 1 of 1

It is certified that error appears in the above-identified patent and that said Letters Patent is hereby corrected as shown below:

In the Claims

In column 6, line 49, in Claim 7, delete "VDC" and insert -- VCD --, therefor.

Signed and Sealed this
Sixth Day of January, 2015

Michelle K. Lee
*Deputy Director of the United States Patent and Trademark Office*